(12) United States Patent
Bailey et al.

(10) Patent No.: US 8,640,764 B2
(45) Date of Patent: Feb. 4, 2014

(54) FLUID PRESSURE VESSEL EMPLOYING FILTER BAGS

(71) Applicants: Scott K. Bailey, Greenwood, SC (US); Winfried Beyel, Nideggen (DE); Christopher Scott Rau, Battle Creek, MI (US); Lidia T. Hamilton, Hasbrouck Hts., NJ (US); Florito Montano, Union, NY (US); Mark Anthony Quintel, Kalamazoo, MI (US); Derek R. Thelen, Westphalia, MI (US)

(72) Inventors: Scott K. Bailey, Greenwood, SC (US); Winfried Beyel, Nideggen (DE); Christopher Scott Rau, Battle Creek, MI (US); Lidia T. Hamilton, Hasbrouck Hts., NJ (US); Florito Montano, Union, NY (US); Mark Anthony Quintel, Kalamazoo, MI (US); Derek R. Thelen, Westphalia, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/909,587

(22) Filed: Jun. 4, 2013

(65) Prior Publication Data

US 2013/0263435 A1    Oct. 10, 2013

Related U.S. Application Data

(62) Division of application No. 12/949,966, filed on Nov. 19, 2010, now abandoned.

(51) Int. Cl.
*B22D 23/00* (2006.01)
*B23K 11/08* (2006.01)

(52) U.S. Cl.
USPC .................. 164/76.1; 29/527.5; 219/102

(58) Field of Classification Search
USPC .............. 164/47, 76.1; 29/527.5; 219/102
See application file for complete search history.

(56) References Cited

U.S. PATENT DOCUMENTS

| | | | |
|---|---|---|---|
| 2,921,686 A | 1/1960 | Forman et al. | |
| 3,170,873 A | 2/1965 | May | |
| 4,526,689 A | 7/1985 | Morgan | |
| 6,192,918 B1 * | 2/2001 | Jaasma et al. | 137/382 |
| 2003/0155291 A1 | 8/2003 | Simonson | |
| 2005/0199533 A1 * | 9/2005 | Samways et al. | 210/97 |
| 2012/0097585 A1 * | 4/2012 | Chancellor et al. | 210/87 |

FOREIGN PATENT DOCUMENTS

CH    484 688 A    1/1970

\* cited by examiner

*Primary Examiner* — Kevin P Kerns
(74) *Attorney, Agent, or Firm* — Fay Sharpe LLP

(57) ABSTRACT

A flow through fluid pressure vessel of the type containing filter bags formed by a tubular shell, a one-piece cast bottom closure with an integral outlet port fitting welded to one end of the shell, a one-piece cast combination bulkhead and flange ring welded to the opposite end of the shell, a cast inlet fitting inserted through an aperture in the shell and connected to an inlet opening through the bulkhead and welded to the shell aperture. A cast closure/lid forms an inlet plenum with the bulkhead and is releasably sealed over the flange ring.

7 Claims, 11 Drawing Sheets

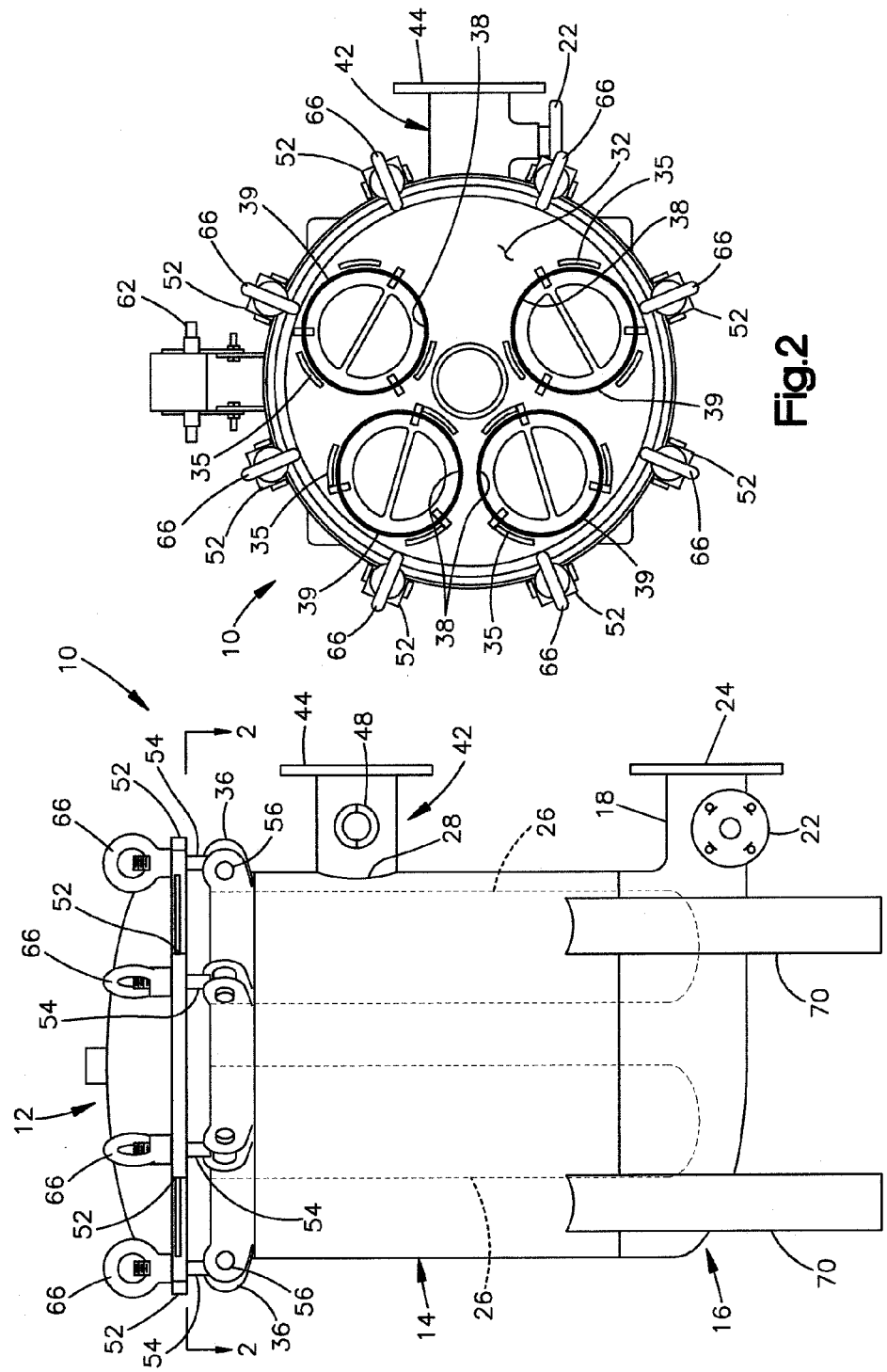

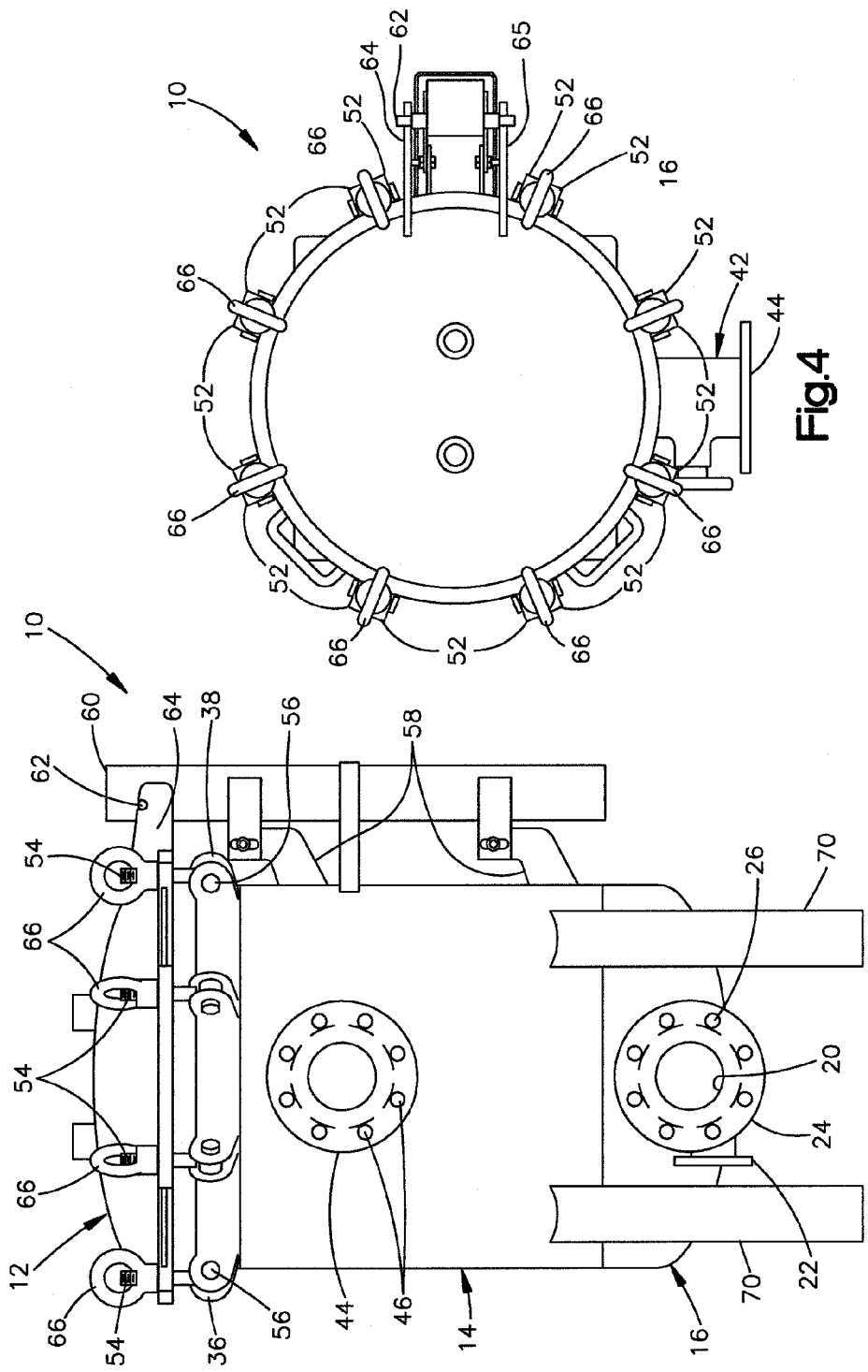

FLUID PRESSURE VESSEL EMPLOYING FILTER BAGS

This is a Divisional Application of U.S. Application Ser. No. 12/949,966, filed Nov. 19, 2010, by Scott K. Bailey et al., entitled "FLUID PRESSURE VESSEL EMPLOYING FILTER BAGS" and is incorporated by reference herein in its entirety.

BACKGROUND

The present disclosure relates to fluid pressure vessels of the type containing filter media such as bags for filtering flow of fluid such as water and aqueous solutions employed in systems in which pressurized fluid enters the vessel through an inlet, is filtered through the filtering media such as filter bags, and exits the pressure vessel through an outlet port connected to the fluid system. The pressure vessels of this type typically have a closure or lid which is, upon depressurization of the vessel, removable for access to the filter for cleaning or replacement of the filter media.

Heretofore, pressure vessels of the aforesaid type typically are fabricated of preformed components such as by a combination of cast pieces and sheet formed pieces which are assembled by weldment. This has resulted in a relatively costly arrangement due to the large amount of welding required to join the components in addition to the complexity of fixtures required for positioning the pieces for welding during assembly.

Thus, it has been desired to provide a way or means of fabricating a fluid pressure vessel employing removable filter media with a lid or closure which is readily removable for access to the filter media and which has a significantly reduced manufacturing cost and yet is capable of maintaining the vessel integrity for extended periods of time required in the fluid system applications for which the vessel is intended.

BRIEF DESCRIPTION

The present disclosure describes a unique pressure vessel employing fluid filter media for filtering flow between the inlet port and the outlet port with a removable lid or closure for permitting access to the filter media such as filter bags. The vessel shell is constructed of a rolled sheet and welded to form a tubular shell with a one-piece cast closure and outlet port welded to one end of the tubular shell. A one-piece cast combination bulkhead and rim flange is welded to the opposite end of the tubular shell. A one-piece cast inlet port fitting is inserted through an aperture in the tubular shell and connects to a central aperture in the bulkhead and is welded to the bulkhead and shell. The inlet port fitting and the outlet port on the one-piece cast closure are each formed with an integral standard process connection, such as a circular flange for attachment to fluid pressure conduits for installation in a fluid system. A one-piece cast lid or closure is pivotally attached to the end of the tubular shell over the bulkhead and is releasably clamped thereon to permit opening of the lid for access to the interior of the vessel. The space between the bulkhead and lid forms an inlet plenum. The bulkhead has additional apertures therein through which are attached filter media, such as bags, which may be readily removed and replaced upon opening of the lid. The pressure vessel of the present disclosure thus is comprised of only four pieces secured by weldment on which the removable lid or closure is mounted thereby providing a relatively low cost, simplified construction of the pressure vessel. In one embodiment, the removable lid is clamped by circular clamp bars; and, in another embodiment, the flange is provided with pivotal attachment lugs for swing bolts and the lid has slotted lugs permitting the bolts to engage the lid lugs for securing the lid to the flange with ring nuts threaded onto the swing bolts.

BRIEF DESCRIPTION OF THE DRAWINGS

FIG. 1 is a front elevation view of an exemplary embodiment of a pressure vessel with removable lid and replaceable filter elements in accordance with the present disclosure;

FIG. 2 is a section view taken along section indicating lines 2-2 of FIG. 1;

FIG. 3 is a right side elevation view of the pressure vessel of FIG. 1;

FIG. 4 is a top view of FIG. 3;

DETAILED DESCRIPTION

Referring to FIGS. 1-4, the first exemplary embodiment of a pressure vessel of the present disclosure is indicated generally at 10 and has a removable lid indicated generally at 12 which is clamped and sealed upon a tubular shell indicated generally at 14. The shell 14 has provided thereon and secured thereto, such as by weldment, an end closure indicated generally at 16 and which includes an outlet port fitting 18 formed integrally therewith as a one-piece member. In the present practice, it has been found satisfactory to cast the closure member 16 of a suitable corrosion resistant material such as, for example AISI type 304 stainless steel; however, other suitable castable corrosion resistant materials may be used.

Figure 5:
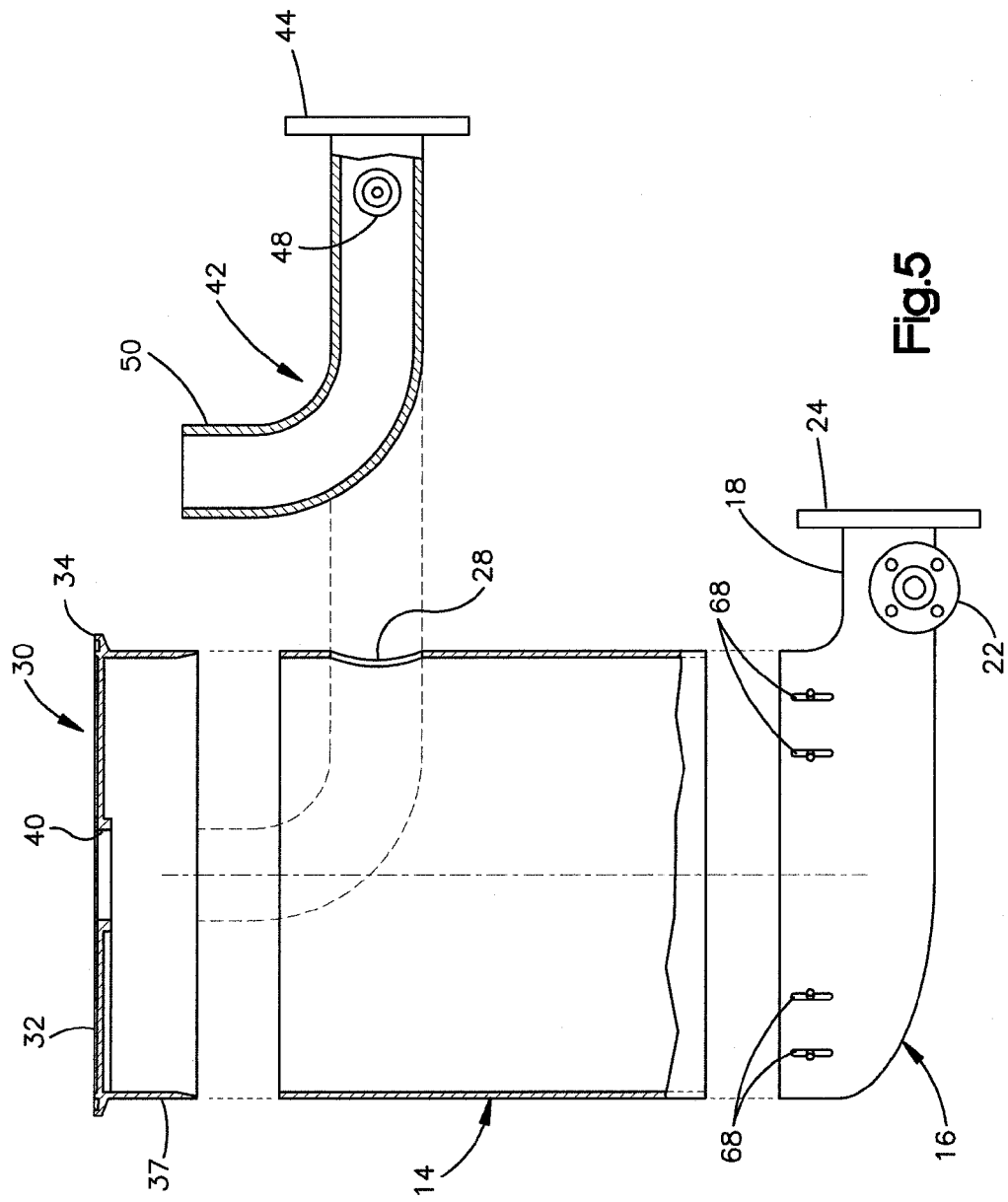
FIG. 5 is an exploded view of the pressure vessel components prior to assembly by weldment.
Figure 6:
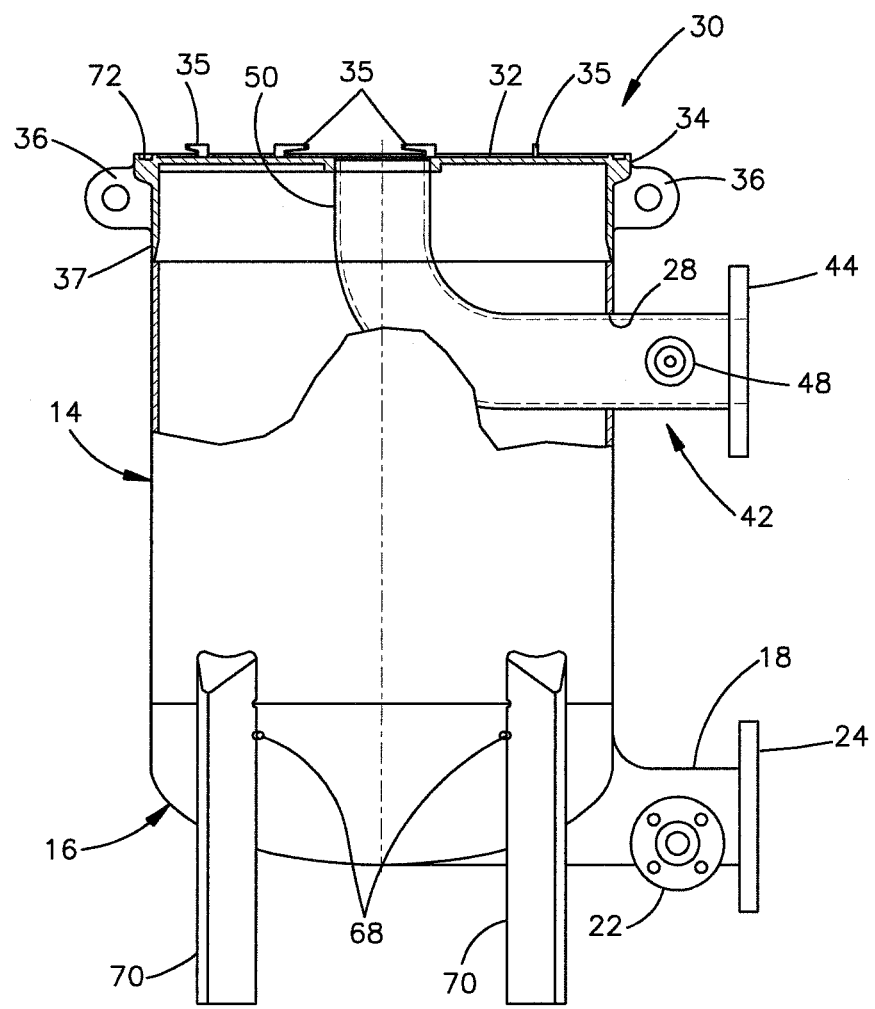
FIG. 6 is a view of the components of FIG. 5 after assembly.
Figure 7:
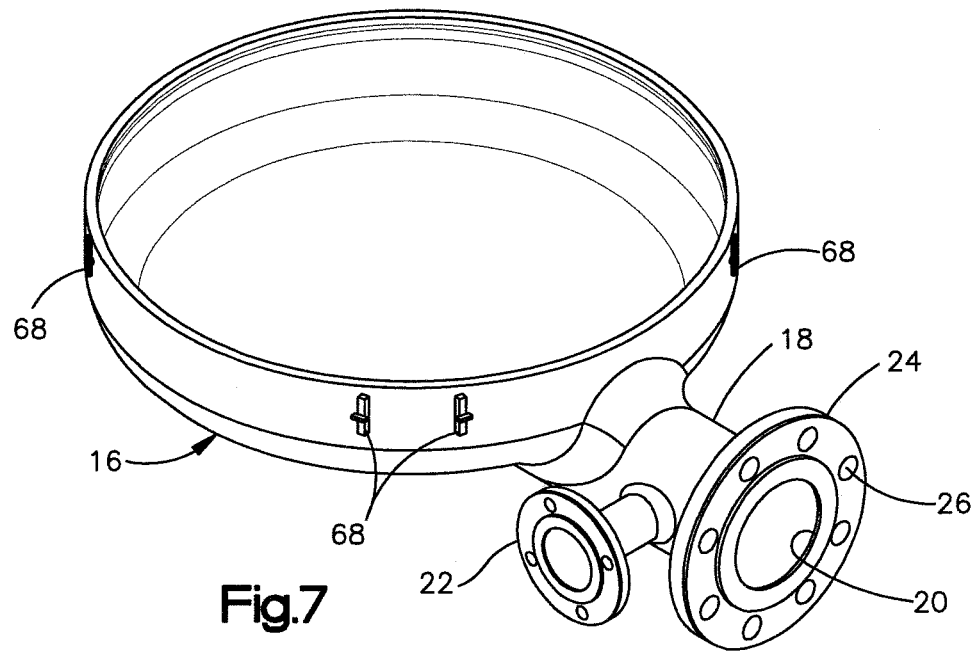
FIG. 7 is a perspective view of the one-piece closure and outlet port fitting of the assembly of FIG. 6.

Referring to FIGS. 5-7, the closure member 16 is shown as having an outlet port 20 and passage communicating with the interior of the generally cup shaped closure 16. In the present practice, it has been found satisfactory to provide an auxiliary fitting and port 18 cast integrally with the member 16 as one piece as denoted by reference numeral 22 which may be employed for ancillary purposes as, for example attachment of a fluid pressure sensor or drain line. The fitting 18 has a circular flange 24 which may have a plurality of apertures 26 provided thereabout for attachment to a corresponding flange in the fluid system for which the vessel 10 is to be employed.

In the present practice, the tubular shell 14 may be formed from flat sheet stock and seam welded to provide the cylindrical tubular configuration illustrated in the drawings. The shell 14 may also be formed of corrosion resistant material such as stainless steel such as AISI type 304, although other materials may be used. The tubular shell 14 is formed with an aperture 28 through the side thereof for insertion of a fitting as will hereinafter be described.

Referring to FIGS. 5, 6, 9 and 10, the tubular shell has attached to the end thereof opposite the closure 16, a combination bulkhead 32 and annular flange 34 indicated generally at 30 formed as a one-piece member. Member 30 also includes a downwardly extending cylindrical wall section 37 which is attached to the end of the shell 14 by weldment. In the present practice, the member 30 is cast of corrosion resistant material such as stainless steel such as AISI type 304; however, other materials may be used. The relatively thin plate-like bulkhead portion 32 is reinforced with a central web on its underside within the annular outer flange portion 34. In the embodiment 10, flange 34 has provided integrally formed therewith a plurality of radially outwardly extending circumferentially spaced attachment lugs 36 cast integrally thereon. The bulkhead has a central aperture 40 provided therein which is adapted for connection to an inlet port fitting as will hereinafter be described.

Figure 9:
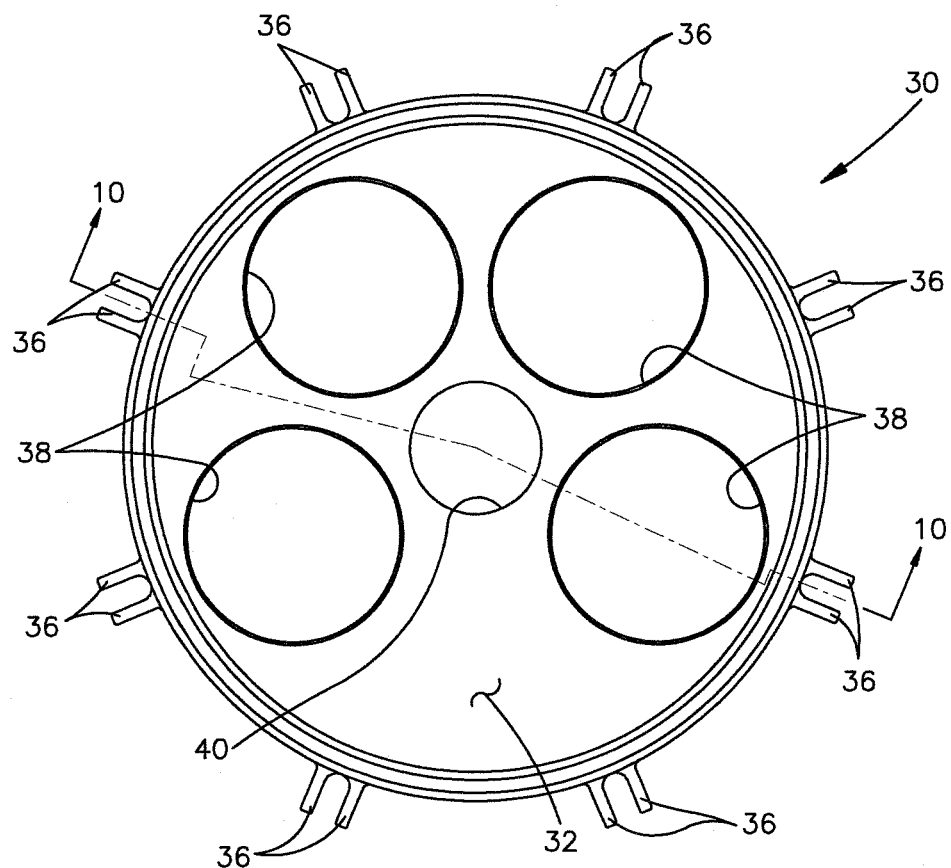
FIG. 9 is a top view of the combination bulkhead and flange piece of the assembly of FIG. 6.
Figure 10:
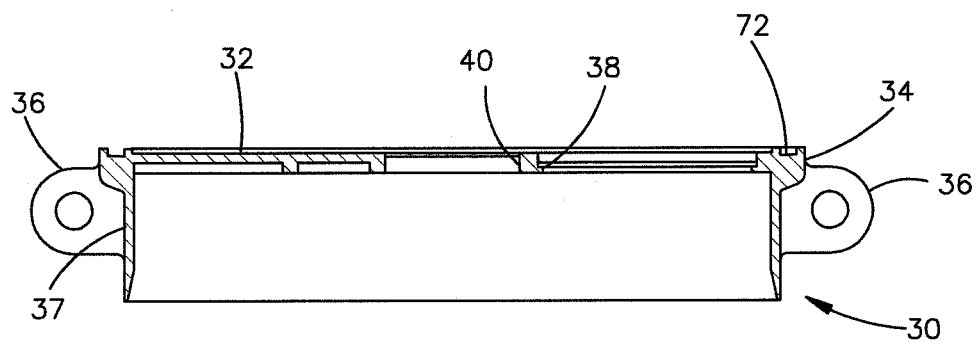
FIG. 10 is a section view taken along section indicating lines 10-10 of FIG. 9.
Figure 11:
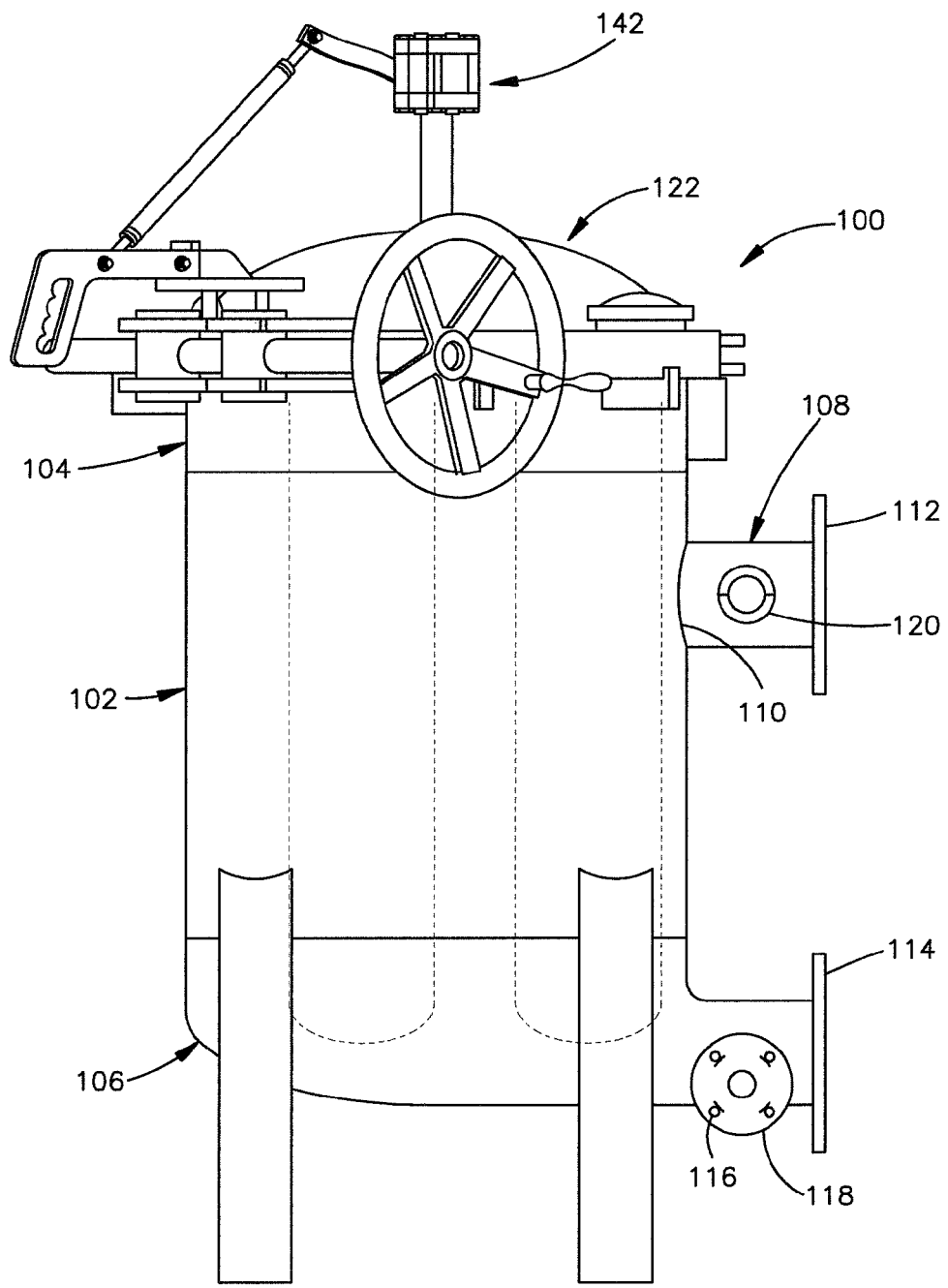
FIG. 11 is a front elevation view of another exemplary embodiment of the pressure vessel of the present disclosure.

Referring to FIGS. 9 and 10, the flange 34 of member 30 has provided in the upper surface thereof, a circumferential groove 72 which is adapted for receiving therein an annular seal, such as an O-ring (not shown) for sealing against the undersurface of the rim of the lid 12 in a manner known in the art of such pressure vessels.

Figure 8:
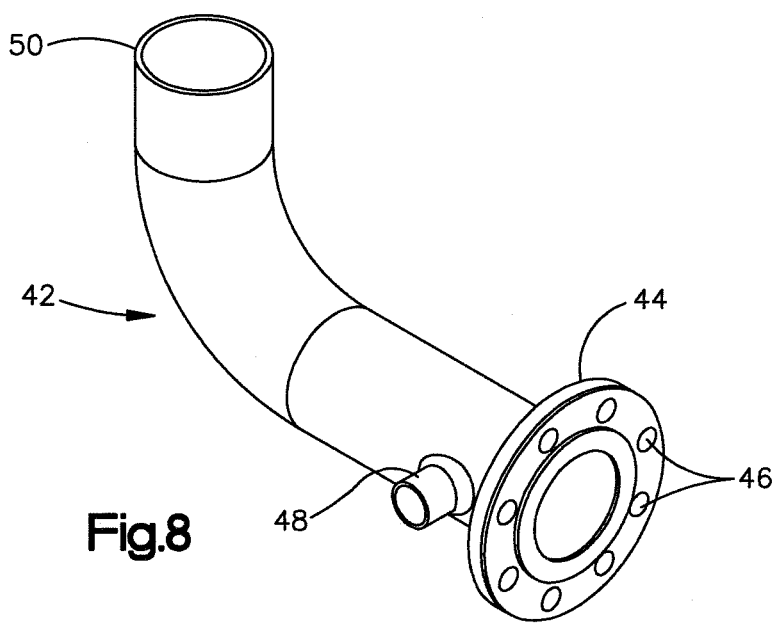
FIG. 8 is a perspective view of the inlet port fitting of the assembly of FIG. 6.

Referring to FIGS. 5, 6 and 8, a tubular inlet fitting having a generally right angle or elbow configuration is indicated generally at 42 and has formed integrally therewith an annular flange 44 on one end thereof which flange has a plurality of circumferentially spaced apertures 46 provided thereon for attachment thereto. The fitting 42 may also include cast integrally therewith a sensing port fitting 48. Referring to FIGS. 5 and 6, the inlet fitting 42 has the curved end of the fitting denoted by reference numeral 50 inserted through aperture 28 and placed in communication with the central aperture 40 provided in the bulkhead 32 and is secured thereto by suitable weldment; and, the wall of the fitting 42 adjacent the flange 44 is secured in the aperture 28 in the tubular shell by weldment to provide a permanent seal of the fitting in the well of the pressure vessel shell 14 thereby forming the assembly illustrated in FIG. 6.

Referring to FIGS. 9 and 10, the bulkhead 32 has a plurality of circumferentially spaced apertures 38 formed therethrough which are adapted for each having a filtering media attached thereto which are not shown in FIGS. 9 and 10 but are indicated in dashed line in FIG. 1 and denoted with reference numeral 26. In the present practice, the filtering media comprise filter bags contained and supported within a perforated restraining basket (not shown) both of which have an open end secured about the apertures 38 in the bulkhead by hold down rings 39 retained by suitable attachment clips 35 as illustrated in FIGS. 2 and 6.

In the version 10, the lid 12 is cast of corrosion resistant material such as AISI type 304 stainless steel; however, other materials may be used. Lid 12 has a plurality of radially outwardly extending circumferentially spaced lugs 52 formed thereon integrally therewith into each of which is received a swing bolt 54 pivotally mounted on pins 56 provided in the lugs 36 formed on the flange 34. The swing bolts 54 are secured in the lugs 52 by ring nuts 66.

The shell 14 has attached thereto, such as by weldment, supporting brackets 58 which support a counter balance spring mechanism 60 which has a pivot pin 62 provided thereon. A pair of arms 64, 65 extend outwardly from and are formed integrally with the lid 12 and/or hinged on pin 62 for pivotal raising of the lid upon release of the swing bolts 54.

In practice, the closure member 16 has provided thereon disposed about the outer periphery thereof, in circumferentially spaced arrangement, a plurality of mounting lugs 68 which may be integrally cast with the member 16. Referring to FIGS. 1, 3 and 6, the lugs 68 have attached thereto, as for example by weldment, support members or legs 70 for providing support of the vessel 10 on a horizontal surface.

Referring to FIGS. 11-16, another version of the pressure vessel of the present disclosure is indicated generally at 100 and includes a tubular shell portion indicated generally at 102 and combination upper flange and bulkhead piece indicated generally at 104 and a bottom closure and outlet port integrally formed as one piece indicated generally at 106. An inlet fitting, similar to the fitting 42 for the version 10, is indicated generally at 108 and is secured through an aperture 110 formed in the side wall of the tubular shell 102 and includes an integral attachment flange 112. A one-piece closure and outlet member 106 includes a flange 114 for external attachment thereto and also a signal port 116 formed integrally therewith with a flange 118 adapted for connection externally thereto. Inlet fitting 108 also includes a signal port fitting 120 for external connection thereto. A removable lid indicated generally at 122 is pivotally attached to the shell 102 as will hereinafter be described.

Figure 12:
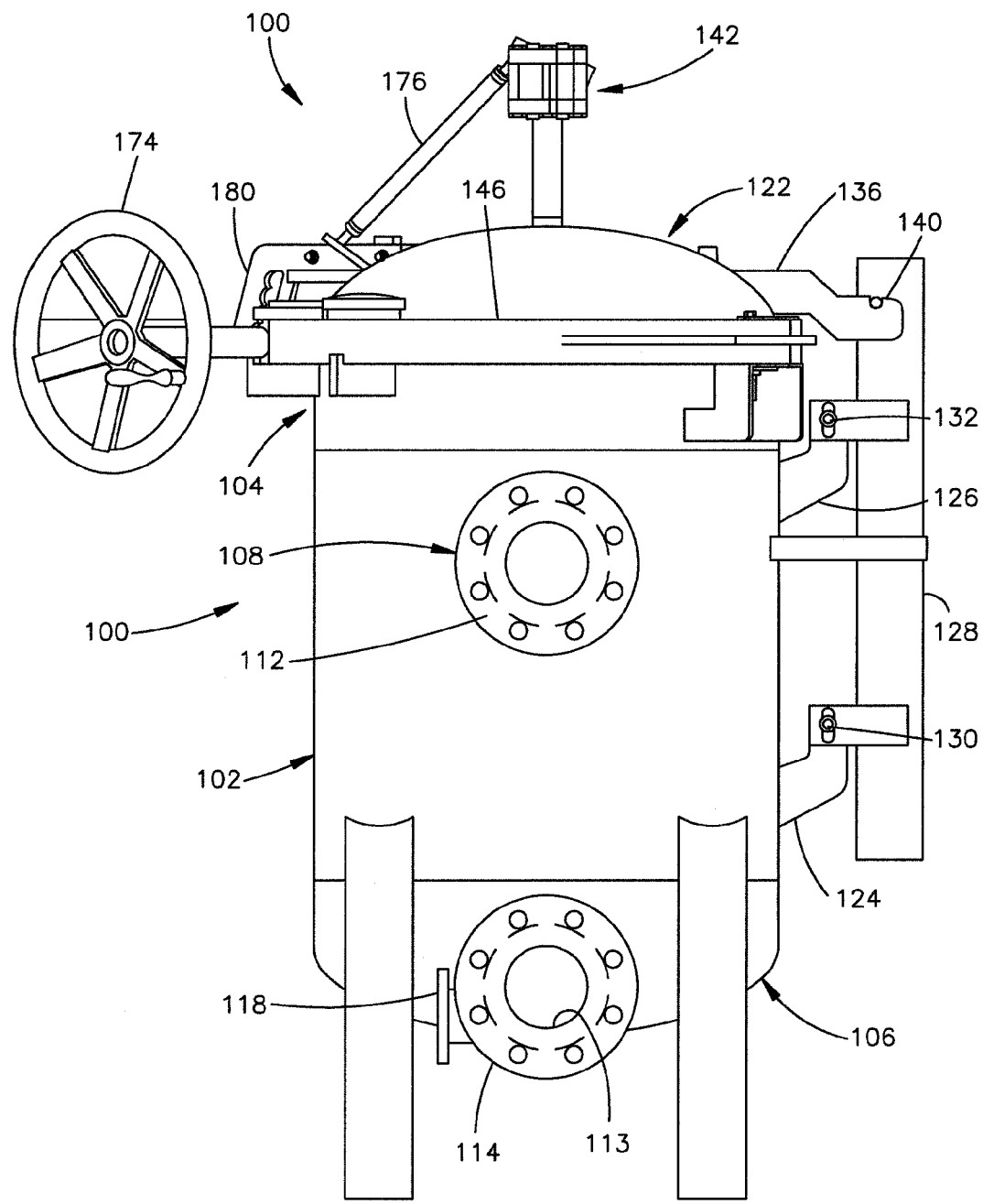
FIG. 12 is a right side elevation view of the assembly of FIG. 11.

Referring to FIG. 12, shell 102 has a pair of mounting lugs 124, 126 vertically disposed thereon and extending outwardly therefrom and may be attached to the shell by any convenient expedient as for example weldment. The lugs 124, 126 have attached thereto a counter balance spring mechanism 128 which may be secured to the lugs 124, 126 by suitable fasteners 130, 132.

Figure 13:
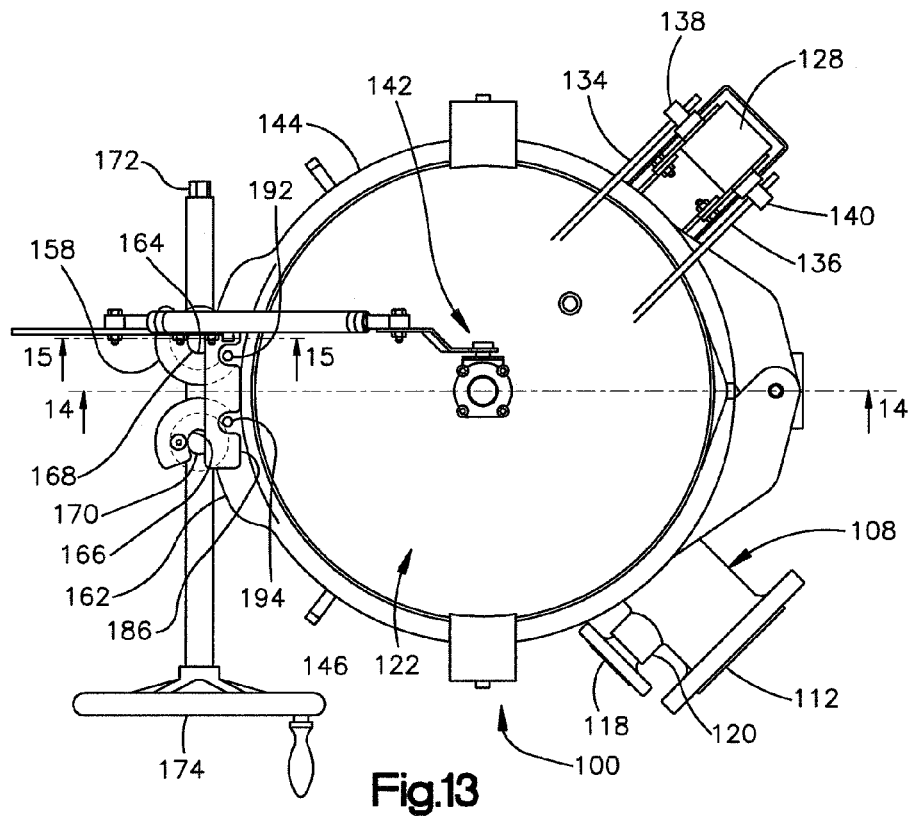
FIG. 13 is a top view of FIG. 12 rotated 45° counterclockwise.

Referring to FIGS. 12 and 13, lid 122 has provided thereon a pair of spaced parallel outwardly extending arms 134, 136 which are pivotally engaged with respectively pivot pins 138, 140 extending from mechanism 128. The arms 134, 136 may be either formed integrally with the lid 122 as one piece or attached thereto by weldment.

Lid 122 has attached thereto in the central region thereof and extending vertically upwardly therefrom a pressure relief valve indicated generally at 142 as shown in FIGS. 11-14.

Figure 14:
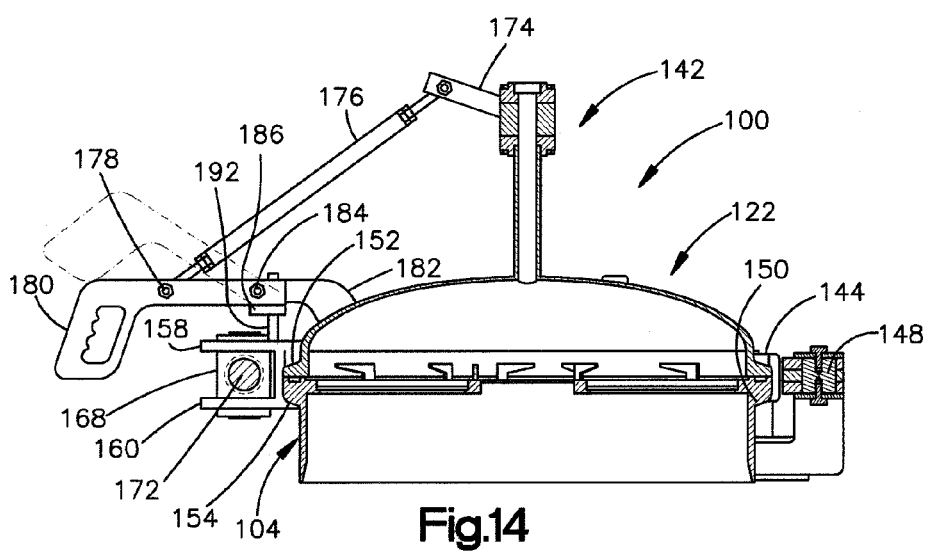
FIG. 14 is a partial section view taken along section indicating lines 14-14 of FIG. 13.
Figure 15:
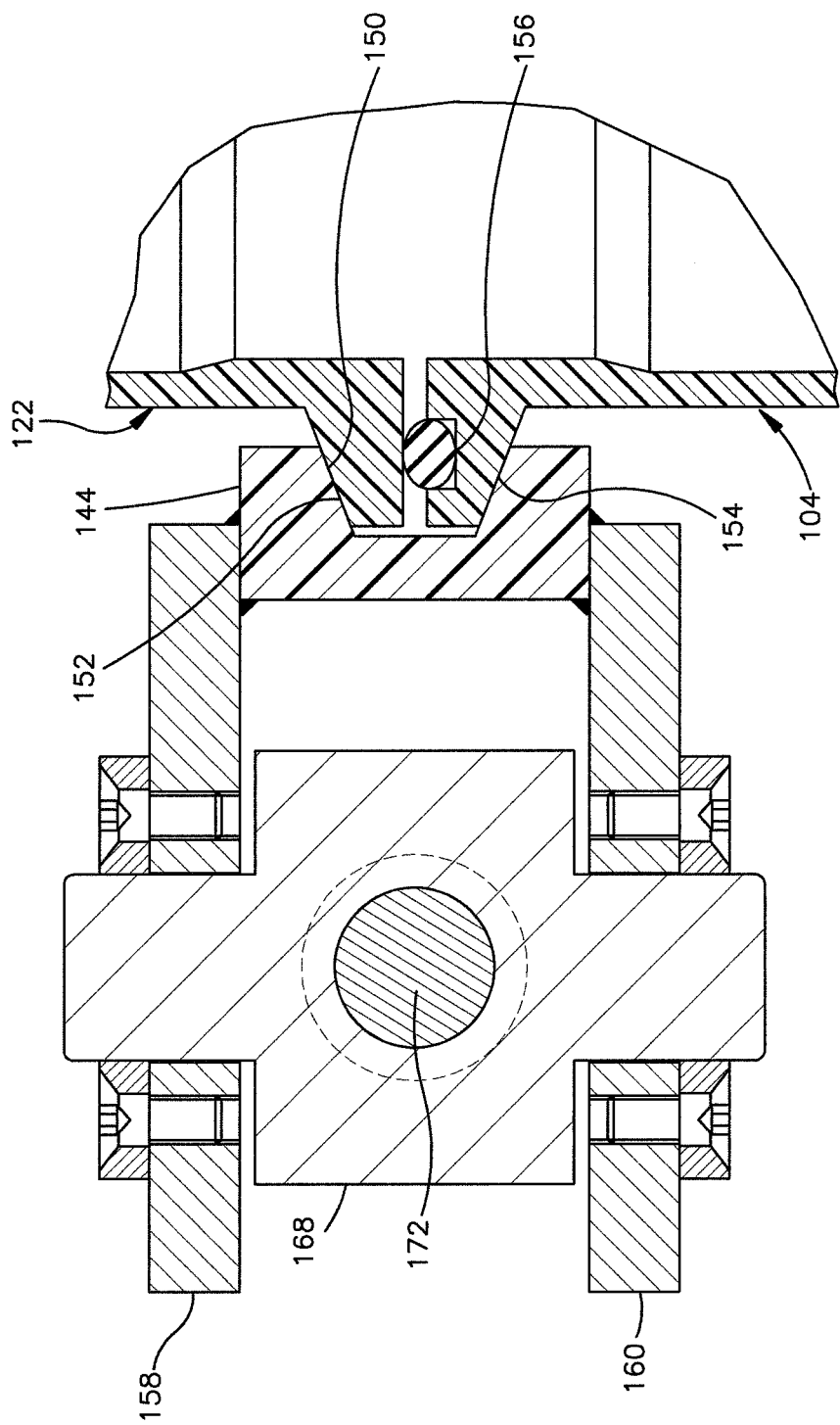
FIG. 15 is an enlarged view of a portion of FIG. 14.
Figure 16:
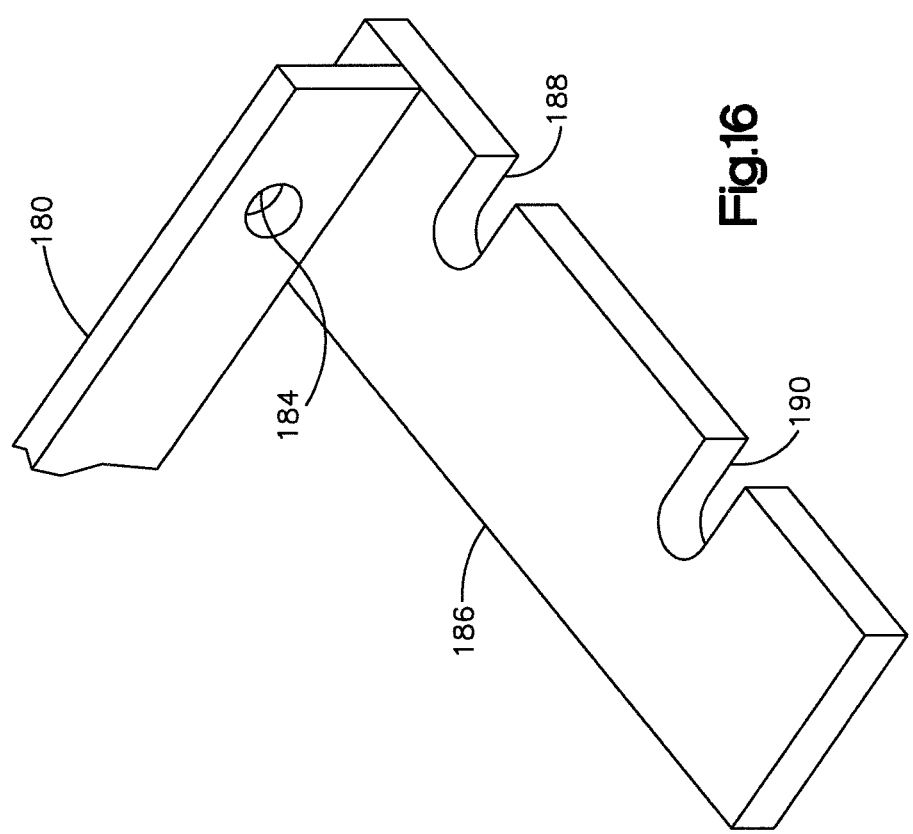
FIG. 16 is a perspective view of the clamp locking bar of the version of FIG. 11.

Referring to FIGS. 11-14, the lid 122 is secured to the flange 104 of the vessel by a pair of generally c-shaped clamp bands 144, 146 which are hinged or pivotally connected by a clevis pin 148 each at an end thereof for pivotal opening and closing. The clamp bands each have a tapered groove such as groove 150 formed in band 144 as shown in FIGS. 14 and 15. The groove 150 in band 144 and a corresponding groove (not shown) in band 146, each engage an annular tapered surface provided on the rim of the lid 122 as denoted by reference numeral 152 and a tapered surface 154 provided on the flange member 104 for effecting clamping of the lid to the flange member 104.

Referring to FIGS. 14 and 15, an annular seal ring 156 is provided in a groove formed around the periphery of the flange member 104 for providing sealing of the lid on the flange 104.

The clamping bands 144, 146 each have a pair of clevis plates attached to the free ends thereof such as plates 158, 160 attached to clamping band 144 as shown in FIGS. 14 and 15. One of the plates 162 attached to clamping band 146 is illustrated in FIG. 13. The clevis plates 158, 160, 162 each have a hook shaped cutout such as denoted by reference numerals 164 for plate 158 and 166 for plate 162 which are operative to engage clevis pins 168, 170.

Clevis pin 168 for clamp band 144 is threadedly engaged, in a direction transversely to its pivotal connection to the plates 158, 160, by a threaded hand wheel shaft 172. Upon clockwise rotation of the hand wheel 174, the clevis pins 168, 170 are drawn together closing the clamping bands 144, 146 over the tapered surfaces of the lid and the shelf flange thereby clamping the lid to the shell member 104 and effecting sealing of the lid about the flange by seal ring 156.

Referring to FIGS. 11-14 and 16, the pressure relief valve 142 has an actuating arm 174 operatively connected thereto which arm is pivotally connected to one end of a link 176 which has its opposite end pivotally connected at 178 to a locking handle 180 which has the end thereof pivotally connected to a lug 182 extending upwardly from the lid 122 by a fastener 184. The handle 180 has an aperture 186 formed therein through which the fastener 184 is engaged to permit pivotal movement of the handle in a vertical plane about the lug 182. The handle 180 has attached thereto a locking bar 186 which has a pair of spaced cutouts or slots 188, 190 formed along an edge thereof which slots engage respectively, upstanding pins 192, 194 provided on the clevis plates respectively of the clamps 144, 146. In operation, with the handle in the downward position, or locking position shown in FIG. 11, the slots 188, 190 engage the pins 192, 194 to prevent link 176 from causing arm 174 to open relief valve 142. When the handle 180 is raised to the position shown in dashed outline in FIG. 14, link 176 moves arm 174 to effect opening of the pressure relief valve to relieve the pressure in the vessel prior to rotating the handrail to release the clamping bands 144, 146. The version 100 thus employs a pair of c-shaped clamping bands for engaging surfaces on the flange of the vessel and on the lid for effecting closure and sealing thereof.

The present disclosure describes a unique pressure vessel of the type containing filter media for flow through filtering of fluid in a fluid system such as hydraulic fluid in hydraulically operated equipment or machinery in which the vessel has a removable closure or lid for permitting access to the interior for replacement of the filter media. The pressure vessel of the present disclosure has a tubular shell with an annular flange formed on the upper end thereof which flange is cast as a one-piece member having a bulkhead portion and a rim provided for sealing with the lid. The bulkhead portion is provided with an inlet aperture for attachment of an inlet fitting through the wall of the shell to permit fluid to enter the vessel and flow to a plenum formed between the lid and the bulkhead and through apertures in the bulkhead to the filter media contained in the shell. The lower end of the vessel shell is closed by a one-piece cast closure including an integral outlet port fitting to provide a complete pressure vessel assembly comprised of only four structural members. The pressure vessel of the present disclosure thus provides for an improved lower cost and simplified construction for a fluid pressure vessel containing filter media for a flow through filtering.

The exemplary versions have been described, obviously, modifications and alterations will occur to others upon reading and understanding the preceding detailed description. It is intended that the exemplary versions be construed as including all such modifications and alterations insofar as they come within the scope of the appended claims or the equivalents thereof.

The invention claimed is:

1. A method of making a fluid pressure vessel of the type having flow through filters therein with a removable lid/closure for filter access comprising:
    (a) seam welding sheet stock and forming a first portion of a tubular shell;
    (b) casting a one-piece closure with an integrally formed outlet fitting thereon and welding the closure to one end of the first portion of the tubular shell;
    (c) casting a one-piece bulkhead having a control inlet port therein and a plurality of filter receiving apertures and having an annular rim flange forming a second portion of the tubular shell and a plurality of radially outwardly extending lugs and an annular seal groove therein and welding the second portion of the tubular shell to an end of the first portion of the tubular shell opposite the one end;
    (d) casting an inlet fitting and inserting one end of the inlet fitting through an aperture in the first section tubular shell and securing the one end to the bulkhead central inlet port and welding the inlet fitting to the aperture;
    (e) casting a one-piece closure/lid having a plurality of radially outwardly extending lugs and disposing the closure/lid for removably closing on the rim flange;
    (f) disposing filter media elements through the filter receiving apertures into the tubular shell; and,
    (g) providing fasteners and interconnecting the lugs on the second portion of the tubular shell with the lugs on the closure/lid and securing the closure/lid on the annular flange.

2. The method defined in claim 1, wherein the step of casting an inlet fitting includes integrally casting an attachment flange.

3. The method defined in claim 1, wherein the step of securing the one end to the bulkhead inlet fitting includes welding.

4. The method defined in claim 1, wherein the step of disposing the closure/lid includes welding hinge structure to the tubular shell and pivotally mounting the closure/lid on the hinge structure.

5. The method defined in claim 1, wherein the step of casting a closure/lid includes integrally casting a flange on the outlet fitting.

6. The method defined in claim 1, further comprising integrally casting a signal port outlet fitting on the closure outlet fitting.

7. The method defined in claim 1, further comprising integrally casting a signal port fitting on the inlet fitting.

* * * * *

UNITED STATES PATENT AND TRADEMARK OFFICE
CERTIFICATE OF CORRECTION

PATENT NO. : 8,640,764 B2  Page 1 of 1
APPLICATION NO. : 13/909587
DATED : February 4, 2014
INVENTOR(S) : Bailey et al.

It is certified that error appears in the above-identified patent and that said Letters Patent is hereby corrected as shown below:

In the Claims

Column 6 line 17
In claim 1, subparagraph (c), first line, replace "control" with --central--.

Signed and Sealed this
Twenty-seventh Day of May, 2014

Michelle K. Lee
*Deputy Director of the United States Patent and Trademark Office*